(12) United States Patent
Seaton

(10) Patent No.: US 7,650,908 B2
(45) Date of Patent: Jan. 26, 2010

(54) VALVE ASSEMBLY AND RELATED ARRANGEMENTS

(75) Inventor: Jonathan David Seaton, Rugby (GB)

(73) Assignee: ALSTOM Technology Ltd., Baden (CH)

( * ) Notice: Subject to any disclaimer, the term of this patent is extended or adjusted under 35 U.S.C. 154(b) by 158 days.

(21) Appl. No.: 12/038,115

(22) Filed: Feb. 27, 2008

(65) Prior Publication Data

US 2008/0163944 A1 Jul. 10, 2008

Related U.S. Application Data

(63) Continuation of application No. PCT/EP2006/065717, filed on Aug. 28, 2006.

(30) Foreign Application Priority Data

Sep. 1, 2005 (GB) ................................ 0517702.7

(51) Int. Cl.
*F16K 1/44* (2006.01)
*F16K 1/32* (2006.01)
(52) U.S. Cl. ................................ 137/637.2; 137/614.18
(58) Field of Classification Search ............... 137/637.2, 137/614.18, 614.16, 614.17
See application file for complete search history.

(56) References Cited

U.S. PATENT DOCUMENTS 3,884,259 A * 5/1975 Hosmer et al. ............ 137/637.2
4,041,979 A * 8/1977 Grotloh ................. 137/599.16
5,971,018 A 10/1999 Karlsson et al.
6,070,605 A 6/2000 Steenburgh

FOREIGN PATENT DOCUMENTS

| DE | 2523297 | 11/1976 |
|---|---|---|
| JP | 09032996 | 2/1997 |
| WO | WO2007002594 | 3/2007 |

OTHER PUBLICATIONS

Search Report for United Kingdom Patent App. No. 0517702.7 (Feb. 23, 2006).
International Search Report for PCT Patent App. No. PCT/EP2006/065717 (Nov. 7, 2006).

* cited by examiner

*Primary Examiner*—Kevin L Lee
(74) *Attorney, Agent, or Firm*—Cermak Kenealy Vaidya & Nakajima LLP; Adam J. Cermak

(57) ABSTRACT

A valve assembly (100) has an inlet port (104) and an outlet port (106) linked by a fluid conduit (102) for allowing fluid to pass therebetween. The valve assembly includes a stop valve having a spindle (112) that is centrally mounted within the valve assembly and a valve head (108) mounted on the spindle (112). The stop valve spindle (112) is operable to move the stop valve head (108) between an open position, in which the inlet port (104) is in communication with the outlet port (106), and a closed position, in which the outlet port is isolated from the inlet port. Also provided is a control valve having at least one spindle (114) that is eccentrically mounted within the valve assembly and a valve head (110) mounted on the at least one control valve spindle (114). The at least one control valve spindle is operable to move the control valve head (110) for graduated flow control of fluid passing along the fluid conduit (102) The stop valve head (108) is nested within the control valve head (110) when the stop valve is in the open position.

19 Claims, 2 Drawing Sheets

VALVE ASSEMBLY AND RELATED ARRANGEMENTS

This application is a Continuation of, and claims priority under 35 U.S.C. § 120 to, International Application No. PCT/EP2006/065717, filed 28 Aug. 2006, and claims priority under 35 U.S.C. §§ 119, 365 therethrough to Great Britain Application No. 0517702.7, filed 1 Sep. 2005, the entireties of which are incorporated by reference herein.

BACKGROUND

1. Field of Endeavor

The present invention relates to valve assemblies and, in particular but not exclusively, to Intermediate Pressure (IP) steam valve assemblies incorporating a stop valve and a control valve.

2. Brief Description of the Related Art

As the skilled person will appreciate, a valve between, for example, a steam generator and a turbine, operates in a harsh environment, suffering from both heat and buffeting from the steam flow that it is used to control. Two valves are generally required—a control or 'governor' valve, to control the quantity of steam flowing though the turbine (and therefore the speed or load of the turbine) and a 'stop valve', which acts in an emergency to stop the steam flow, perhaps to prevent damage to a turbine. At the most basic level, such valves include a plug, or valve head, mounted on a spindle that can be advanced into an operating position partially or wholly blocking a fluid conduit.

More recently, valve assemblies incorporating both stop valves and control valves in one chamber have been developed. In order to house both valves in one chamber, two main options have been adopted as outlined below.

It has been proposed to have two concentric spindles, each carrying a valve that can be advanced separately. Such a valve assembly is described in U.S. Pat. No. 5,971,018, in the name of Karlsson. This valve assembly has the disadvantage that the fast closing or stop valve is actuated by the same fluid that is being controlled. This causes problems in engineering the seals and springs for high temperature and pressure applications. Furthermore, in some embodiments, one spindle is run through another, which is more likely to result in mechanical failure than running a spindle through a static boss, as is established and proven practice.

In a second valve assembly, housing both a stop valve and a control valve, the spindles of each valve are operated from different ends of the assembly using separate actuation mechanisms. Some embodiments seat the stop valve head inside the control valve and, for example, operate the stop valve by pulling and the control valve by pushing. An example of such an assembly is seen in DE-A-2 523 297. However, in such assemblies, one valve spindle is generally in the line of the steam flow, and the duct must turn a corner to avoid its actuator. Every corner in the duct results in lost dynamic pressure of the gas being controlled, which in this case is steam. This can be partly recovered in a diffuser (which is a gradually widening channel) and this is the solution adopted in the prior art. However, such a diffuser is usually made of a costly metal and it is desirable that the use of such material be minimized.

SUMMARY

According to a first aspect of the invention there is provided a valve assembly having an inlet port and an outlet port linked by a fluid conduit for allowing fluid to pass therebetween, the valve assembly comprising a stop valve having a spindle that is centrally mounted within the valve assembly and a valve head mounted on the spindle, the stop valve spindle being operable to move the stop valve head between an open position, in which the inlet port is in communication with the outlet port, and a closed position, in which the outlet port is isolated from the inlet port, the valve assembly further comprising a control valve having at least one spindle that is eccentrically mounted within the valve assembly and a valve head mounted on the at least one control valve spindle, the at least one control valve spindle being operable to move the control valve head for graduated flow control of fluid passing along the fluid conduit, the stop valve head being nested within the control valve head when the stop valve is in the open position.

Preferably, the at least one control valve spindle is eccentrically mounted with respect to the control valve head and the control valve is mounted on at least two spindles. Providing a plurality of spindles (in particular, three or more substantially evenly distributed spindles) may prevent a moment of force from occurring about an individual spindle.

Another aspect of the invention embraces the combination of a valve assembly as above and a controller arranged to monitor conditions external to and/or internal to the valve assembly and to control the position of the valves within the assembly according to those conditions.

In a further aspect of the invention, a turbine system comprises a steam generator, a steam turbine, and a fluid conduit for transferring steam from the steam generator to the steam turbine, wherein the valve assembly or the combination as above, controls steam flow through the fluid conduit.

The stop valve may be mounted on a central spindle. A central spindle is generally preferred as a moment of force is likely to result about the end of a spindle; a valve with a central spindle is therefore mechanically easier to guide without jamming than a valve operated by one or two eccentric spindles. The stop valve is more important than the control valve from a safety perspective, and it is therefore advantageous to select the central location for it, as this results in more reliable guidance. The stop valve will generally be fully retracted or fully extended and may therefore be kept in mechanical engagement with either the support or a housing of the valve assembly. This means that the spindle is generally supported by the mechanical engagement of the valve and therefore will not often be subjected to moments.

The stop valve may have a conical valve face, which is advantageous since when retracted, the stop valve will then provide a conical face to help turn the steam flow. This is particularly the case when the stop valve is provided in a central location and/or in the fully retracted position, in which back-seating is provided to give mechanical rigidity.

At least one of the control valve actuator and the stop valve actuator may be arranged to move its respective valve using hydraulic or pneumatic power; preferably hydraulic. This provides a convenient means for controlling the valves and can produce the high pressures that may be required in some embodiments to overcome the pressure of a fluid passing through the assembly.

The stop valve actuator may include a biasing means arranged to close the stop valve in the event of a failure. This provides an advantageous failsafe feature.

BRIEF DESCRIPTION OF THE DRAWINGS

Embodiments of the invention will now be described by way of example only with reference to the accompanying drawings, in which.

DETAILED DESCRIPTION OF EXEMPLARY EMBODIMENTS

Figure 1:
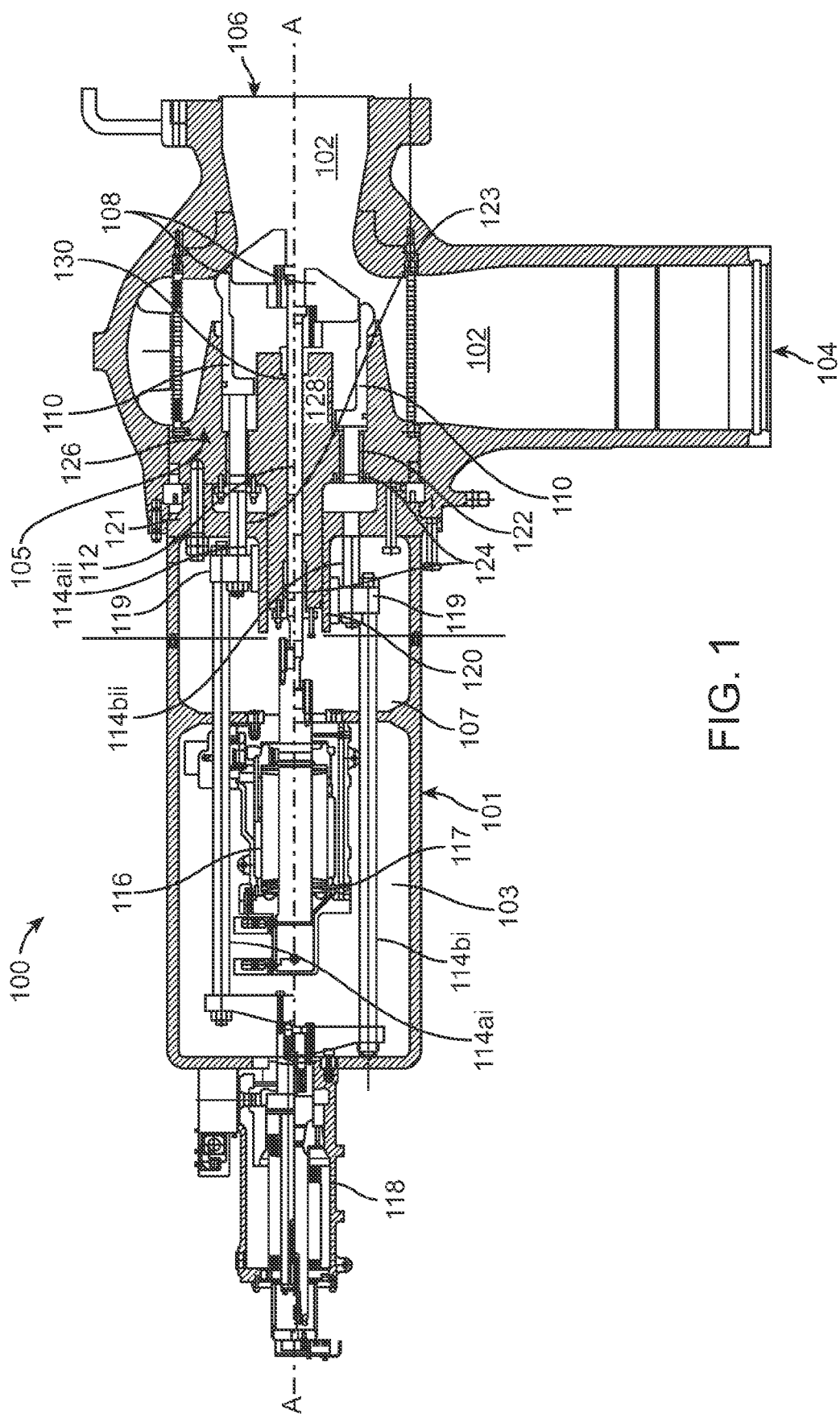
FIG. 1 shows a cross sectional view of a valve assembly wherein valves are shown in a closed position above an axis A-A and in an open position below the axis A-A.

As is shown in the embodiment of FIG. 1, a valve assembly—which in this case is a 90-degree valve assembly 100—includes a steam valve assembly housing 101 with a steam conduit 102, which in this embodiment turns the steam though 90° between an inlet port 104 and an outlet port 106. The steam valve assembly housing 101 provides a pressure vessel for the steam travelling through the valve assembly 100.

The valve assembly 100 further includes a stop valve head 108 and a control valve head 110. The valve heads 108, 110 are arranged to restrict and/or close the fluid conduit 102 by advancing into a position where they block (thus isolating the outlet port from the inlet port) or partially block the outlet port 106. The stop valve head 108 is mounted on a central spindle 112, while the control valve head 110 is mounted on eccentric spindles 114a, 114b that connect to the end of the control valve head 110 which is distant from the outlet port 106.

The housing 101 encloses a stop valve actuator 116 arranged to control the position of the stop valve head 108 by advancing and retracting the central spindle 112 on an axis aligned along the centre of the outlet port 106, an axis substantially coincident with or parallel to axis A-A.

The valve assembly further includes sub-compartments 103, 107 of the valve assembly housing 101. Sub-compartment 103 functions as a stop valve actuator housing. As such, its inside is not exposed to the pressure within the rest of the valve assembly housing 101.

Outside the housing 103, and mounted thereon, is a control valve actuator 118, arranged to control the position of the control valve head 110 by advancing and retracting the eccentric spindles 114a, 114b parallel to axis A-A. The stop valve actuator housing 103 provides mechanical support for the control valve actuator 118. The spindles 114a, 114b are arranged approximately equidistant from, parallel to, and on either side of axis A-A. In the illustrated embodiment, the spindles 114a, 114b are each formed in two sections 114ai, 114aii, 114bi, 114bii, with the rear spindle section 114ai, 114bi (i.e., that section furthest from the control valve head 110) being spaced further apart from each other than the front spindle sections 114aii, 114bii. The front and rear spindle sections 114ai, 114aii, 114bi, 114bii are joined together by a circular mounting 119 that slides on the outside of a support bush 120. The greater separation of the rear sections 114ai, 114bi provides space to house the stop valve actuator 116 therebetween, while the mounting 119 supports and stabilizes the front and rear spindle sections.

In this embodiment, the stop valve actuator 116 is provided with a failsafe mechanism such that it is opened to its retracted position under hydraulic power but is biased, for example with a series of disc springs 117, such that, when the valve is in its retracted position and in the event of a mechanical failure of the hydraulic mechanism and/or an electrical failure of the stop valve actuator 116, the stop valve 108 closes the fluid conduit 102.

The spindle support bush 120 is integral with an end wall 121 of sub-compartment 107. Bolted to the valve head side of end wall 121 is a gland 105 that provides support and sliding bearing surfaces for the control valve head 110, its actuating front spindle sections 114aii 114bii, and the stop valve spindle 112. The control valve head 110 slides within an outer collar portion 126 of gland 105, while the stop valve spindle 112 slides in a hole 130 within a central boss portion 128 of gland 105. This central boss portion projects in both axial directions to provide support for the stop valve spindle 112, and its rearward axial projection sealingly mates with an interior surface of support bush 120. The gland 105 and end wall 121 are provided with holes 122, 123 through which the front control valve spindle sections 114aii and 114bii pass with a sliding action to actuate the control valve head 110. Each of the holes 122 in gland 105 and the central hole 130 in boss portion 128 is fitted with a graphite seal 124 to form a fluid-tight seal about the spindles 112, 114a, 114b such that steam will not escape from the fluid conduit 102. Together, end wall 121 and gland 105 isolate the valve heads 108, 110 from the sub-compartments 103, 107 and retain steam pressure within housing 101.

The control valve head 110 includes a hollow cylindrical sleeve-like structure, with the lip of the sleeve advancing into the fluid conduit 102 to constrict or open up the channel 102 as required to regulate the flow of steam passing through the channel 102, and therefore the speed or load of a turbine powered by the steam. The stop valve head 108 is normally housed within the control valve head 110, but can be advanced out of the mouth of the sleeve-like control valve head 110 when required to obturate the channel 102. In normal operation of the valve assembly 100, the stop valve head 108 is retracted within the control valve sleeve, which protects the stop valve from buffeting. Furthermore, the rest position of the stop valve head 108 is fully retracted, in which position the stop valve head 108 is secured by back-seating against the forwardly projecting boss portion 128 of gland 105, which thereby acts as a support.

Figure 2:
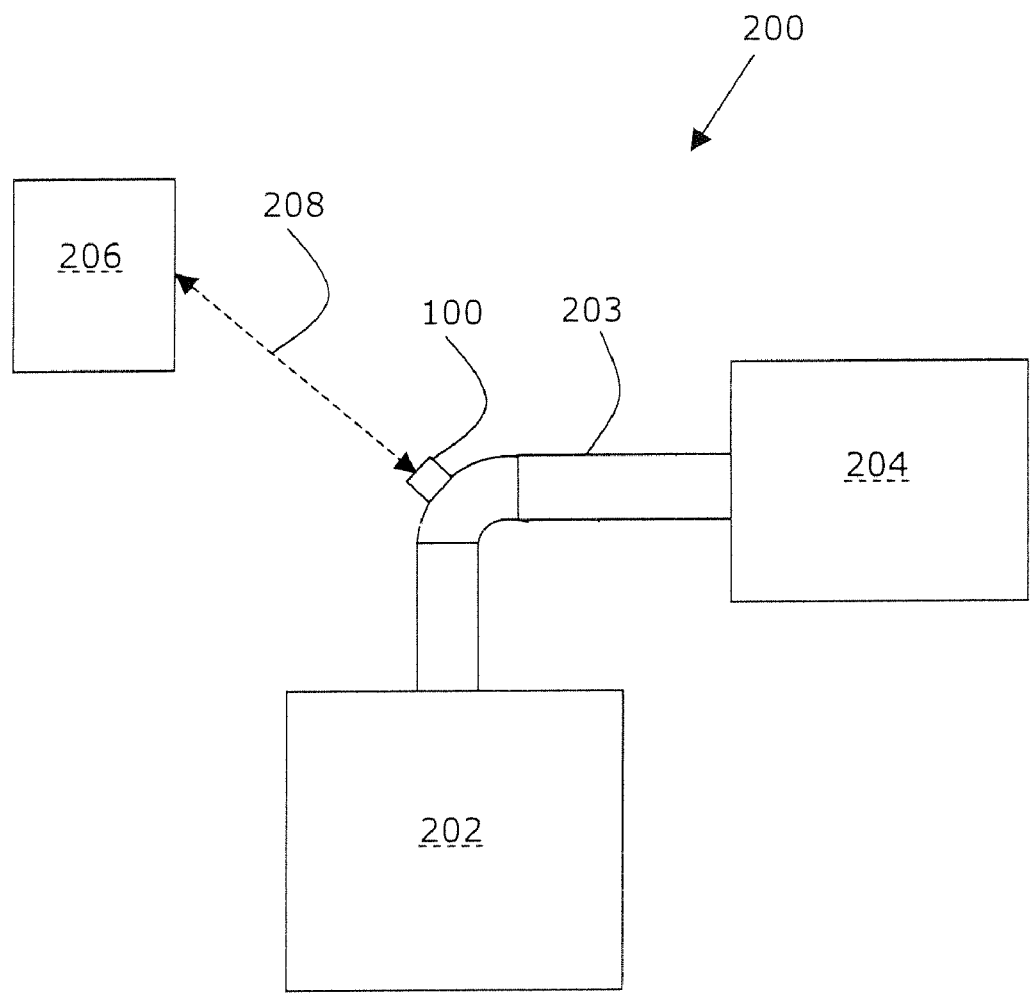
FIG. 2 diagrammatically shows a steam power generator incorporating the valve assembly of FIG. 1.

FIG. 2 shows the valve assembly 100 in situ as part of a steam power generator 200. The valve assembly 100 is arranged such that its steam conduit 102 is part of a channel 203 between a steam generator 202 and a turbine 204. The valves 108, 110 of the assembly 100 are controlled by a controller 206, which monitors factors such as the speed or load of the turbine 204, to ascertain what changes should be made to improve the running of the power generator 200. The controller 206 controls the valve assembly via a communication link 208, which in this embodiment is a bus cable connected to the valve assembly 100.

It should be noted from FIGS. 1 and 2 that the conduit 102 turns the steam through an angle of 90 degrees. During normal operation, the stop valve head 108 is only partially nested within the control valve head, as shown in the bottom half of FIG. 1, and in this position its conical bevelled face assists the conduit in turning the steam by deflecting it into the outlet port 106.

In use of the power generator 200, the steam generator 202 heats water to generate steam which passes from the steam generator 202 into the channel 203, through the fluid conduit 102 of the valve assembly 100. The fluid conduit 102 is normally open (i.e., the inlet port is in communication with the outlet port), with the stop valve head 108 fully retracted and the control valve head 110 positioned to regulate the pressure of the steam and, therefore, the speed of the turbine 204. The controller 206 monitors the condition of the power generator 200 and regulates the control valve head 110 accordingly by extending and retracting the eccentric spindles 114a, 114b using the control valve actuator 118.

If operational conditions require that steam flow through channel 203 should be prevented (which may be due to an emergency but may equally be part of the normal operation of the power generator 200), the controller 206 controls the stop valve actuator 116 via the communication link 208 to urge the stop valve forward to its advanced position, in which the fluid conduit 102 is sealed.

Alternative embodiments are envisaged within the scope of the present invention. For example, the control valve may be actuated by only one eccentric spindle instead of the two shown in FIG. 1, although the skilled person will note that such a spindle would have to be well supported mechanically as the moment of force on such a spindle is likely to be significant. Alternatively, the control valve may be provided with three, four or more eccentric spindles. Whilst this will result in an arrangement that is mechanically stable, the skilled person will appreciate that seals in such assemblies are expensive. Furthermore, increasing the number of seals increases the risk that one of the seals will fail and therefore the number of seals in a single assembly is preferably minimized. During the design process there will be a trade-off between the desire for a mechanically stronger multiple-spindle arrangement and the desire to minimize the number of seals.

Any discussion of the prior art throughout the specification is not an admission that such prior art is widely known or forms part of the common general knowledge in the field.

Unless the context clearly requires otherwise, throughout the description and the claims, the words are to be construed in an inclusive as opposed to an exclusive or exhaustive sense.

LIST OF REFERENCE NUMBERS

100. Valve assembly
101. Housing
102. Steam Conduit
103. Stop valve actuator housing sub-compartment of housing 101
104. Inlet port
105. Gland
106. Outlet port
107. Sub-compartment of housing 101
108. Stop valve head
110. Control valve head
112. Stop valve spindle
114ai. Eccentric spindle—rear section
114aii. Eccentric spindle—front section
114bi. Eccentric spindle—rear section
114bii. Eccentric spindle—front section
116. Stop valve actuator
117. Disc springs
118. Control valve actuator
119. Slideable mounting
120. Support bush
121. End wall of sub-compartment 107
122. Holes in gland 105
123. Holes in end wall 121
124. Graphite seals
126. Outer collar portion of gland 105
128. Central boss portion of gland 105
130. Hole in central boss portion 128
200. Power generator
202. Steam generator
203. Channel or duct
204. Turbine
206. Controller
208. Communication link While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A system comprising:
    a valve assembly comprising
        an inlet port, an outlet port, and a fluid conduit fluidly connecting the inlet and outlet ports for allowing fluid to pass therebetween,
        a stop valve having a spindle that is centrally mounted within the valve assembly and a valve head mounted on the spindle, the stop valve spindle being configured, arranged, and operable to move the stop valve head between an open position, in which the inlet port is in communication with the outlet port, and a closed position, in which the outlet port is isolated from the inlet port, and
        a control valve having at least one spindle that is eccentrically mounted within the valve assembly and a valve head mounted on the at least one control valve spindle, the at least one control valve spindle being configured, arranged, and operable to move the control valve head for graduated flow control of fluid passing along the fluid conduit, the stop valve head being nested within the control valve head when the stop valve is in the open position; and
    a controller configured and arranged to monitor conditions external to, internal to, or both, the valve assembly and to control the position of the valves within the assembly according to said conditions.

2. A system according to claim 1, wherein the at least one control valve spindle is eccentrically mounted with respect to the control valve head.

3. A system according to claim 1, wherein the at least one spindle of the control valve comprises a plurality of spindles on which the control valve is mounted.

4. A system according to claim 1, wherein the fluid conduit is configured and arranged to turn the fluid though 90 degrees of arc between the inlet port and the outlet port.

5. A system according to claim 1, wherein the stop valve head obturates the outlet port when the stop valve head is in the closed position.

6. A system according to claim 1, wherein the stop valve head, when not in the closed position, is configured and arranged to assist the conduit in deflecting the steam flow though a predetermined angle.

7. A system according to claim 1, further comprising:
    a fluid-tight gland component; and
    wherein the stop valve spindle and the control valve at least one spindle sealingly pass though and are supported by the fluid-tight gland component.

8. A system according to claim 1, further comprising:
    a stop valve actuator configured and arranged to control the stop valve.

9. A system according to claim 8, wherein which the stop valve actuator includes biasing means for closing the stop valve in the event of a failure of the stop valve actuator.

10. A turbine system comprising:
   a steam generator, a steam turbine, and a fluid conduit fluidly connecting the generator and the turbine for transferring steam from the steam generator to the steam turbine; and
   a valve assembly configured and arranged to control steam flow though the fluid conduit, the valve assembly comprising
      an inlet port, an outlet port, and a fluid conduit fluidly connecting the inlet and outlet ports for allowing fluid to pass therebetween,
      a stop valve having a spindle that is centrally mounted within the valve assembly and a valve head mounted on the spindle, the stop valve spindle being configured, arranged, and operable to move the stop valve head between an open position, in which the inlet port is in communication with the outlet port, and a closed position, in which the outlet port is isolated from the inlet port, and
      a control valve having at least one spindle that is eccentrically mounted within the valve assembly and a valve head mounted on the at least one control valve spindle, the at least one control valve spindle being configured, arranged, and operable to move the control valve head for graduated flow control of fluid passing along the fluid conduit, the stop valve head being nested within the control valve head when the stop valve is in the open position.

11. A turbine system according to claim 10, further comprising:
   a controller configured and arranged to monitor conditions external to, internal to, or both, the valve assembly and to control the position of the valves within the assembly according to said conditions.

12. A turbine system according to claim 10, wherein the at least one control valve spindle is eccentrically mounted with respect to the control valve head.

13. A turbine system according to claim 10, wherein the at least one spindle of the control valve comprises a plurality of spindles on which the control valve is mounted.

14. A turbine system according to claim 10, wherein the fluid conduit is configured and arranged to turn the fluid though 90 degrees of arc between the inlet port and the outlet port.

15. A turbine system according to claim 10, wherein the stop valve head obturates the outlet port when the stop valve head is in the closed position.

16. A turbine system according to claim 10, wherein the stop valve head, when not in the closed position, is configured and arranged to assist the conduit in deflecting the steam flow though a predetermined angle.

17. A turbine system according to claim 10, further comprising:
   a fluid-tight gland component; and
   wherein the stop valve spindle and the control valve at least one spindle sealingly pass though and are supported by the fluid-tight gland component.

18. A turbine system according to claim 10, further comprising:
   a stop valve actuator configured and arranged to control the stop valve.

19. A turbine system according to claim 18, wherein which the stop valve actuator includes biasing means for closing the stop valve in the event of a failure of the stop valve actuator.

\* \* \* \* \*